US012574392B2

(12) United States Patent
Zheng et al.

(10) Patent No.: US 12,574,392 B2
(45) Date of Patent: Mar. 10, 2026

(54) METHODS AND APPARATUS TO IDENTIFY ABNORMAL BEHAVIOR WITHIN A SET OF INTERNET-OF-THINGS DEVICES

(71) Applicant: Orange, Issy-les-Moulineaux (FR)

(72) Inventors: Tao Zheng, Beijing Dongcheng District (CN); Xiaoyu Wang, Beijing Dongcheng District (CN); Xin Wang, Beijing Dongcheng District (CN)

(73) Assignee: ORANGE, Issy-les-Moulineaux (FR)

( * ) Notice: Subject to any disclaimer, the term of this patent is extended or adjusted under 35 U.S.C. 154(b) by 867 days.

(21) Appl. No.: 17/786,756

(22) PCT Filed: Dec. 14, 2020

(86) PCT No.: PCT/IB2020/001083

§ 371 (c)(1),
(2) Date: Jun. 17, 2022

(87) PCT Pub. No.: WO2021/123918

PCT Pub. Date: Jun. 24, 2021

(65) Prior Publication Data

US 2023/0022063 A1    Jan. 26, 2023

(51) Int. Cl.
H04L 9/40 (2022.01)
G16Y 30/10 (2020.01)
H04W 12/67 (2021.01)

(52) U.S. Cl.
CPC .......... H04L 63/1408 (2013.01); G16Y 30/10 (2020.01); H04W 12/67 (2021.01)

(58) Field of Classification Search
None
See application file for complete search history.

(56) References Cited

U.S. PATENT DOCUMENTS 5,777,548 A  *  7/1998  Murakami ............. G08B 17/12
                                                      340/506
9,729,571 B1     8/2017  Ferguson et al.
(Continued)

FOREIGN PATENT DOCUMENTS

CN        105491068 A  *  4/2016
EP        3 211 854 A1     8/2017
(Continued)

OTHER PUBLICATIONS

International Search Report and Written Opinion dated Apr. 20, 2021 for Application No. PCT/IB2020/001083.

*Primary Examiner* — Bassam A Noaman
(74) *Attorney, Agent, or Firm* — Knobbe, Martens, Olson & Bear, LLP

(57) ABSTRACT

Methods and apparatus automatically identify which Internet-of-Things (IoT) devices within a set are behaving in a manner non-compliant with a target behavior. Each IoT device is assigned to a grid point in a notional m-dimensional space. A respective assessment module is arranged to monitor behavior of a group of IoT devices assigned to grid points aligned with one another at a respective position along the respective dimension, and to produce an output indicative of non-compliant behavior if the monitoring indicates that behavior in the group of IoT devices deviates from a behavioral model of the IoT devices of said group. An identification module identifies at least one non-compliant IoT device in the set of IoT devices by combining outputs from the assessment modules assigned to the different dimensions of the space. The assessment modules may use trained machine-learning algorithms embodying a model of normal behavior of the group of devices.

14 Claims, 3 Drawing Sheets

(56) References Cited

U.S. PATENT DOCUMENTS

| | | | |
|---|---|---|---|
| 2003/0072869 A1* | 4/2003 | DeCusatis | G02B 6/132 |
| | | | 427/58 |
| 2009/0208965 A1* | 8/2009 | Tafas | C12Q 1/6841 |
| | | | 435/6.12 |
| 2017/0164224 A1* | 6/2017 | Min | H04W 4/029 |
| 2017/0279833 A1 | 9/2017 | Vasseur et al. | |
| 2017/0329314 A1 | 11/2017 | Shang et al. | |
| 2018/0183680 A1* | 6/2018 | Chen | H04L 63/1425 |
| 2019/0018955 A1* | 1/2019 | McGrew | G06F 21/554 |
| 2019/0058697 A1* | 2/2019 | Chang | H04L 63/0807 |
| 2020/0076831 A1 | 3/2020 | Baughman et al. | |
| 2021/0344569 A1* | 11/2021 | Su | H04L 9/40 |

FOREIGN PATENT DOCUMENTS

| | | | |
|---|---|---|---|
| EP | 3 528 462 A1 | 8/2019 |
| WO | WO 2016/140912 A1 | 9/2016 |
| WO | WO 2019/211856 A1 | 11/2019 |
| WO | WO 2020/210152 A1 | 10/2020 |

* cited by examiner

N devices

METHODS AND APPARATUS TO IDENTIFY ABNORMAL BEHAVIOR WITHIN A SET OF INTERNET-OF-THINGS DEVICES

RELATED APPLICATIONS

This application is the U.S. National Phase of Application No. PCT/IB2020/001083 entitled "METHODS AND APPA-RATUS TO IDENTIFY ABNORMAL BEHAVIOR WITHIN A SET OF INTERNET-OF-THINGS DEVICES" and filed Dec. 14, 2020, which claims priority to PCT/CN2019/126052, filed Dec. 17, 2019, each of which is incorporated by reference in its entirety.

The present invention relates to the field of the Internet of Things (IoT). More particularly, the invention relates to apparatus and methods to identify, automatically, abnormal behaviour of individual IoT devices within sets of IoT devices, especially large sets of IoT devices.

The Internet of Things is becoming progressively better established, and the number of deployed IoT devices is increasing at an explosive rate. As a result, the security of IoT devices is becoming more and more important. IoT devices and terminals face many serious security threats including, but not limited to, unauthorized modifications, faking of devices, and so on.

Looked at in a more general manner, it can be seen that there is a need to identify when the behavior of an IoT device is "abnormal", i.e. not complying with some expected (i.e. target) behavior. In many cases such non-compliance may be a sign that the IoT device in question is an inauthentic device. In other cases, the non-compliance could be a sign of device malfunction.

The applicant's earlier patent application PCT/CN2019/81970, entitled "Method and System for Identifying Wireless IoT Devices based-on Machine Learning", proposed to detect authentic and inauthentic IoT devices using an approach based on machine-learning. Specifically, that approach makes use of a trained machine-learning algorithm designed to identify whether or not the behavior of an IoT device behavior is compliant with a model (the model having been learned during the training phase).

IoT devices are often deployed in groups and it may be desired to monitor/check the behavior of all of the IoT devices in the group to see if any of them are failing to comply with some target behavior.

FIG. 1 illustrates the conventional approach for tackling such a situation.

In the example illustrated in FIG. 1 there is a set of N devices, $D_1, D_2, \ldots, D_N$, each of which is configured as an IoT device. For instance, each device Di has communication capabilities and outputs data that is indicative of its own behavior (functioning). In order to identify whether or not a given device, Di, is behaving as expected, the output from the device is compared against a model Ti of target behavior.

The model can be a model embodied in a trained machine-learning algorithm (e.g. as in the above-mentioned earlier application by the applicant), or it can take another form including but not limited to a set of equations, a list of allowed ranges of parameter values, etc. The comparison of device behavior against the corresponding model is per-formed by an assessment module which can be embodied in various types of hardware or software modules. If the device's behavior is not compliant with the appropriate model, then the corresponding assessment module produces an output that indicates non-compliant behavior. The assess-ment modules which assess device behavior against the behavior models can be aggregated to form an overall system, SYS, for monitoring the set of IoT devices.

These days the number of IoT devices that may be deployed as a group can be extremely large. For example, a factory may make use of several hundred robotic arms having their own different routine normal actions. In such a case, a monitoring system of the type illustrated in FIG. 1 would use one hundred models and one hundred monitors which identify these robot-arms' action. As another example, a smart building may make use of ten thousand sensors having their own different normal methods of func-tioning. In such a case, a monitoring system of the type illustrated in FIG. 1 would use ten thousand models and ten thousand monitors which assess these sensors' operations. Approaches of that kind are very intensive in the resources that are required for performing the monitoring function.

The present invention has been made in the light of these issues.

Embodiments of the present invention provide apparatus and methods that identify, automatically, a non-compliant wireless-IoT-device within a set of IoT devices and the embodiments can use reduced resources compared to the FIG. 1 approach in the case of handling a large group of IoT devices.

The present invention provides a system to identify a non-compliant wireless-IoT-device from within a set of plural IoT devices, each IoT device being designed to function in conformity with a respective behaviour model, the system comprising:

a set of monitors arranged to monitor the functioning of said set of IoT devices, to enable non-compliant behav-iour of IoT devices to be detected, non-compliant behaviour of an IoT device being behaviour deviating from the behaviour model applicable to said IoT device;

characterized in that each IoT device is assigned to a respective grid point in an orthonormal m-dimensional space, where m is greater than 1;

a respective subset of the monitors is assigned to each dimension of said m-dimensional space;

in each subset of monitors, each monitor is arranged to monitor behaviour of a group of IoT devices assigned to grid points that are aligned with one another along a direction orthogonal to the respective dimension and to produce an output indicative of non-compliant behav-iour in the event that the monitoring indicates that the behaviour of any of the IoT devices of the group deviates from a behavioural model common to the IoT devices of said group; and in that there is further provided an identification module configured to identify at least one non-compliant IoT device in the set of IoT devices by combining outputs from monitors in the subsets assigned to the different dimensions of the m-dimensional space.

In the above-described system, the assessment modules may be configured to generate data samples comprising time series data extracted from the output of the IoT devices in the group and to assess whether or not the behaviour of the group of IoT devices is compliant with the behavior model by analysis of the data samples comprising the time series data. Such time series data may be extracted from frame headers of wireless data output by the IoT devices. The extracted time series data may exclude data from the pay-load of frames of wireless data output by the IoT devices, in order to avoid potential problems related to encryption of payload data and/or to ensure data privacy is respected. The time series data may also exclude address data representing the addresses of the IoT devices providing the wireless data, because such data is often falsified by unscrupulous actors.

In the above-described identification system, the assessment modules may be configured to implement one-class classification to determine whether behavior of the respective group of IoT devices is compliant or non-compliant with the corresponding behavior model. In some embodiments the assessment modules comprise one-class classification support vector machines.

Embodiments of the invention further provide a corresponding computer-implemented method to identify non-compliant IoT devices, as specified in appended claim 8.

The above-described computer-implemented identification method may detect behaviour deviating from the behavioural model of the IoT devices of a group by employing a trained machine learning module. Such a trained machine-learning module may process data from frame headers of wireless data output by the IoT devices without analysing data from the payload of the frames to which the frames headers belong. Such a trained machine-learning module may process data from frame headers of wireless data output by the IoT devices without address data representing the address of the device providing the wireless data.

Embodiments of the invention still further provide a computer program comprising instructions which, when the program is executed by a processor, cause the processor to carry out the method according to any one of appended claims 9 to 12.

Embodiments of the invention still further provide a computer-readable medium comprising instructions which, when executed by a processor, cause the processor to carry out the method according to any one of appended claims 9 to 12.

The above-mentioned identification apparatus, method, computer program and computer-readable medium enable the automatic identification of non-compliant wireless IoT devices and, in the case of handling large sets of devices, use fewer resources to do so.

Further features and advantages of embodiments of the present invention will become apparent from the following description of said embodiments, which is given by way of illustration and not limitation, illustrated by the accompanying drawings, in which.

Before describing an example embodiment of the invention, a description will first be given of the approach employed in the invention.

As noted above, in the case where it is desired to monitor the operation of a large number of IoT devices, usually substantial resources would be required in order to assess each device's behaviour relative to a model of target behaviour and to identify when an individual IoT device within the group is not compliant with the target behaviour. In the approach employed by embodiments of the invention, a simple and effective technique is used to identify a non-compliant IoT device, using reduced resources. In embodiments of the invention, a multiple-dimension identifying method is proposed. Each of the IoT devices is assigned a multiple-dimension label, each dimension is monitored by several machine learning modules, and different dimensions can be monitored simultaneously.

Figure 2:
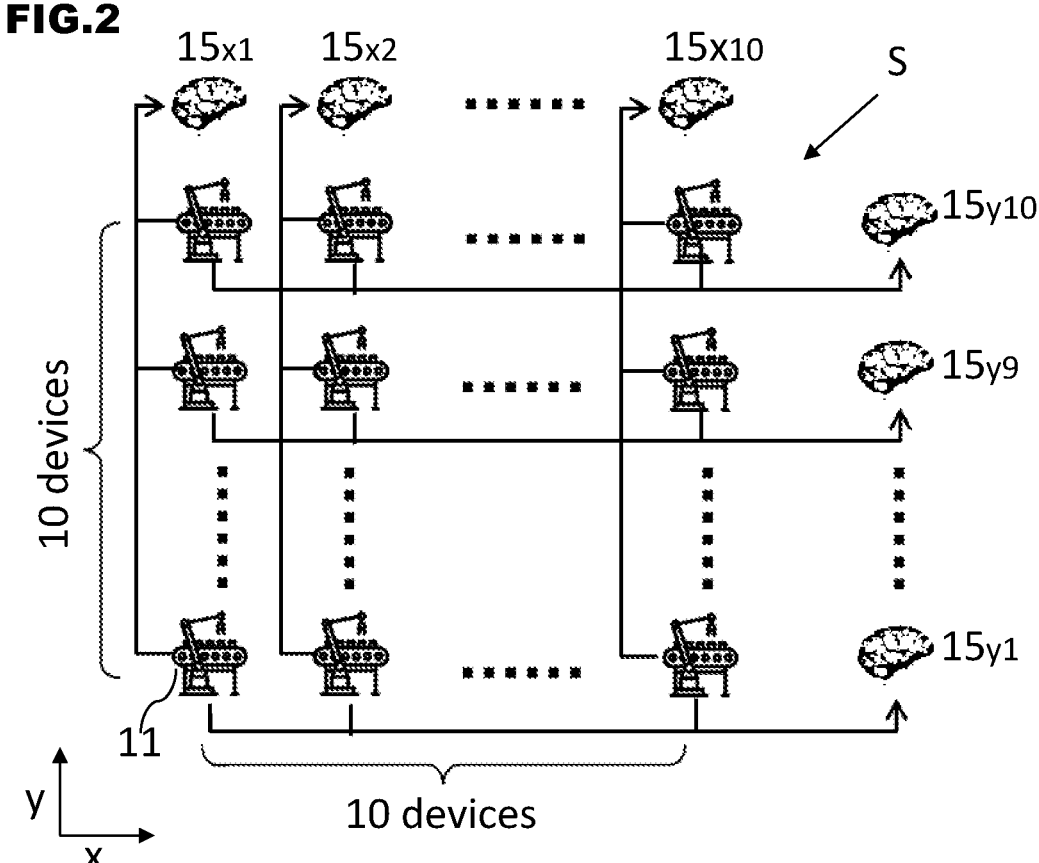
FIG. 2 is a diagram schematically illustrating an example of an approach exploited in embodiments of the present invention to identify non-compliant device behaviour in a group of IoT devices.

FIG. 2 illustrates an example of this approach.

In the example illustrated by FIG. 2, a set S of IoT devices to be monitored includes one hundred IoT devices having a target behaviour model 15. In this example, each IoT device 11 is allocated to a respective grid point (x, y) in a notional two-dimensional space defined by orthogonal x and y dimensions. Thus, in this example it can be considered that the IoT devices are assigned to points that are arranged in ten rows, with each row including points associated with ten IoT devices.

The IoT devices allocated to grid points for which x=1 are treated as a group and are monitored by a common assessment module which assesses their behaviour relative to a behaviour model 15$x$1. More generally, the IoT devices allocated to grid points for which x=j are monitored by a common assessment module which assesses their behaviour relative to a behaviour model 15$xj$ (The behaviour models 15$x$1, . . . , 15$xj$ may be different one from another). In a similar way, the IoT devices allocated to grid points for which y=1 are treated as a group and monitored by a common assessment module which assesses their behaviour relative to a behaviour model 15$y$1. More generally, the IoT devices allocated to grid points for which y=k are monitored by a common assessment module which assesses their behaviour relative to a behaviour model 15$yk$ (The behaviour models 15$y$1, . . . , 15$yk$ may be different one from another). So, in this example each assessment module monitors a group of ten IoT devices.

Each assessment module uses a behavior model 15$xj$, 15$yk$ that embodies the results of learning regarding the operation of the devices in the relevant group. It is not necessary for the devices in the group to have the same behavior or to be of the same type. The behavior model represents normal (target) operation of the overall group of devices even if they have heterogenous behavior as individual devices. In the event that the behavior of an individual device in the group departs from its own normal behavior, the assessment module will, in effect, detect a departure of the group behavior from the group normal.

To identify any individual IoT device's abnormal actions the results obtained by the different assessment modules are combined. So if, for example, the j$^{th}$ assessment module (among the modules assigned to the x-dimension) and the k$^{th}$ assessment module (among the modules assigned to the y-dimension) both detect non-compliant behavior at a corresponding time, it can be determined that the IoT device at the position (j, k) is behaving in a manner that is not compliant with the target behavior.

Figure 1:
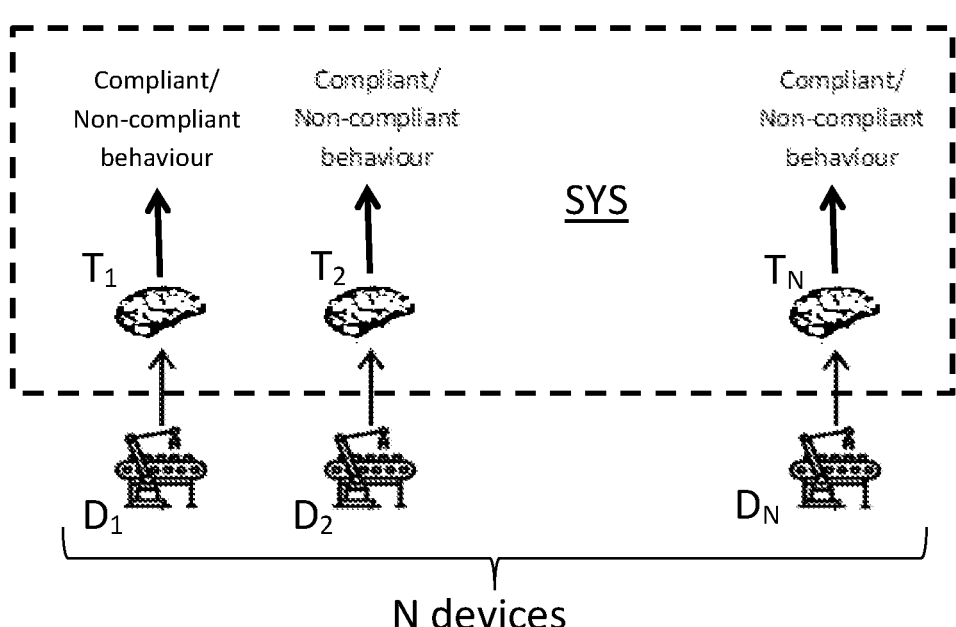
FIG. 1 is a diagram schematically illustrating a group of IoT devices and a system for checking that the device behaviour complies to expected behaviour.

It can easily be seen that the approach that is employed in FIG. 2 makes it possible to identify individual non-compliant devices within the set S using just twenty assessment modules, whereas one hundred modules would be required by the approach according to FIG. 1.

In the example illustrated by FIG. 2, the IoT devices to be monitored are allocated to grid points in a notional two-dimensional space. However, higher-dimensional spaces can also be used. Indeed, by using spaces having higher numbers of dimensions (e.g. 3, 4, or more than 4 dimensions) the total number of assessment modules required to monitor a given number N of IoT devices can be reduced. This phenomenon is illustrated by Table 1 below.

Table 1 provides an example of how the number of required assessment modules varies as the IoT devices are allocated to grid points in spaces having increasing numbers of dimensions. The example represented in Table 1 deals with a case in which there are ten thousand IoT devices to be monitored.

the case of a smart building containing a lot of different type of sensors (e.g. temperature sensors, smoke detectors, etc.), sensors of different types can be gathered in the same group to monitor with a single assessment module.

An embodiment of the invention will now be described for the purposes of illustration, not limitation.

Figure 3:
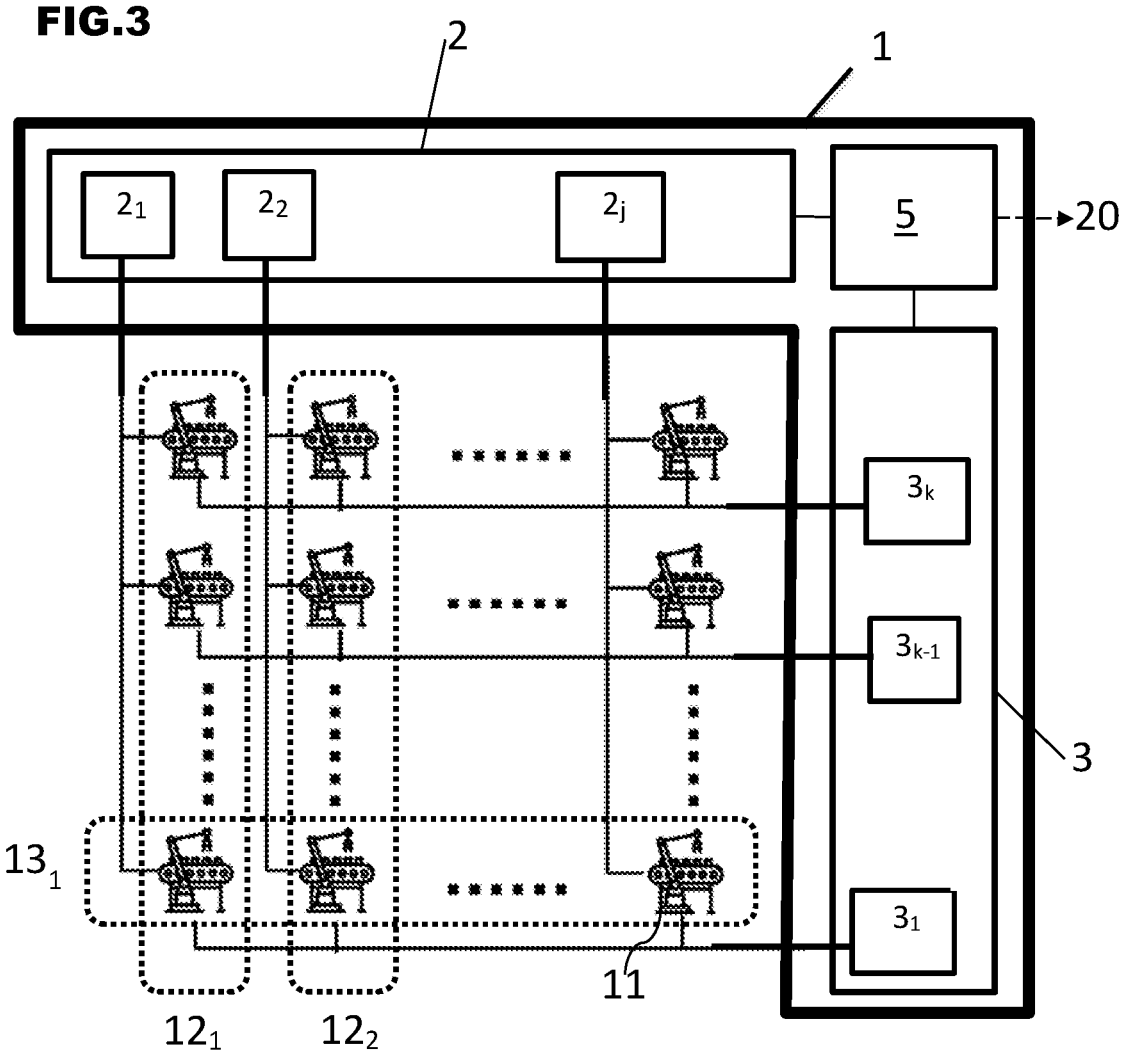
FIG. 3 is a functional block diagram schematically illustrating an example of a system according to a first embodiment of the present invention, to identify non-compliant device behaviour in a group of IoT devices.
Figure 3:
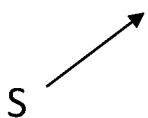

FIG. 3 illustrates an identification system 1 according to a first embodiment of the invention, configured to identify

TABLE 1

| 10000 IoT devices | Traditional | 2-D | 3-D | 4-D | 5-D | 6-D | 7-D | 8-D | 9-D | 10-13D | 14-D |
|---|---|---|---|---|---|---|---|---|---|---|---|
| The smallest number of monitors | 10000 | 200 $(10^2 = 10000)$ | 66 $(22^3 > 10000)$ | 40 $(10^4 = 10000)$ | 35 $(7^5 > 10000)$ | 30 $(5^6 > 10000)$ | 28 $(4^7 > 10000)$ | 32 $(4^8 > 10000)$ | 27 $(3^9 > 10000)$ | 30, 33, 36, 39 | 28 $(2^{14} > 10000)$ |
| Number of devices in one group | 1 | 100 | 455 | 1000 | 1429 | 2000 | 2500 | 2500 | 3334 | 3334 | 5000 |

In the example illustrated by Table 1, in the case where the IoT devices are allocated to a notional 8-dimensional space, or to notional spaces having 10 or more dimensions, the smallest number of required monitors (assessment modules) is greater than for cases where the number of dimensions is lower, so it may be preferred not to make use of spaces having 8 or 10 dimensions.

It can be seen that, as the number of monitors (assessment modules) decreases, the number of devices included in a single group goes up. This implies an increase in the size of data to be collected for training and detection for each single group, and thus an increased need of computing and storage resources for each single group. Moreover, as the number of devices included in the group handled by an assessment module increases, the time required for training the behavior model for that assessment module also increases.

The optimal choice of a number of dimensions for the multi-dimensional space to be employed for a given application may be a trade-off between the expected number of models (monitors) and the number of devices that can be handled as a single group. In many applications, a 2-D space or a 4-D space is a good option.

It will be understood that the IoT devices are not physically positioned in the above-described multi-dimensional space. Instead the multi-dimensional space is a theoretical framework which, in effect, allows multi-dimensional labels to be assigned to the different IoT devices in the set S so that they can be grouped for the purposes of monitoring.

In addition, there is no constraint on how the IoT devices are grouped together, because when data is collected from different types of sensors in order to feed a model, the data produced by the various devices is normalized to a same value interval (range of values) in advance. For instance, in individual non-compliant IoT devices within a set S of IoT devices, particularly a set S having a large number N of devices.

As can be seen from FIG. 3, the main components of the system 1 are a first set 2 of assessment modules 2₁, $2_2$, . . . , 2ⱼ which monitor output from IoT devices 11 in respective groups 12₁, $12_2$, . . . , and 12ⱼ, a second set 3 of assessment modules 3₁, $3_2$, . . . , 3ₖ which monitor output from IoT devices 11 in respective groups 13₁, $13_2$, . . . , and 13ₖ, and an identification module 5 which combines outputs from the various sets 2, 3 of assessment modules to identify individual non-compliant IoT devices.

For example, if the assessment module 2₄ (among the modules assigned to the x-dimension) and the assessment module 3₇ (among the modules assigned to the y-dimension) both detect non-compliant behavior then the identification module 5 identifies the IoT device allocated to the position (4, 7) as being a device that is behaving in a manner that is not compliant with the target behavior.

The results produced by the identification module 5 may be handled in different ways. If desired, the results produced by the identification module 5 may be simply logged in a record file that can be accessed by a user on demand, without any explicit output to the outside of the system. On the other hand, in some cases the identification module 5 may be arranged to produce an output 20 indicating an IoT device that has been identified as behaving in a manner that is non-compliant with the corresponding model.

The output may take various forms and may be delivered to different targets (e.g. a local or remote user, a network operator, a data-collecting module, etc.). For example, in certain embodiments of the invention the output is a notification or alert indicating that a non-compliant IoT device has been detected. The alert may identify which device in the set S has been identified as the non-compliant device. The alert may take any convenient form including but not limited to visual (e.g. lighting an indicator lamp, displaying a message on a screen, updating a screen element in a GUI, producing a printed message or report, transmission of an SMS, etc.) and audible forms (generation of a tone, spoken message, and so on). In certain embodiments of the invention the identification module is arranged to output a report on the result of the analysis performed by the assessment present application by reference. In such a case, information is collected from IoT devices as a time series, and each assessment module uses a trained machine learning algorithm (not shown in the drawings) which has been trained to learn a model of normal (target) behavior using cycles of the time-series data.

The data in each cycle collected from IoT devices in one group (e.g. device-1 to device-n) is concatenated to form a data sample, such as the following:

| device-1......device-1 | device-2...... device-2...... | devices-n......devices-n |
|---|---|---|
| One Second | One Second | One Second |
| | One Group | | modules 2, 3 irrespective of the nature of that result (i.e. irrespective of whether the result demonstrates detection of a non-compliant IoT device).

The present invention is not particularly limited having regard to the manner by which signals are communicated between the IoT devices and the assessment modules 2, 3. The communication can be over wired or wireless links, using any convenient wired or wireless communication protocol/technology. However, in typical applications of the invention the IoT devices output signals according to a wireless communications protocol.

The invention is not particularly limited having regard to the technique by which the assessment modules 2, 3 capture wireless data frames emitted by IoT devices. Thus, in one example in which the WiFi protocol is used, the assessment modules 2, 3 may work in the monitoring mode, and may poll all channels or just focus on specific channels. As another example, in cases where the Bluetooth protocol is used, the assessment modules 2, 3 may chase specific channels according to the protocol, and so on.

The present invention is not particularly limited having regard to the manner in which the assessment modules 2, 3 determine that an IoT device is behaving in a non-compliant manner. However, for the purposes of illustration, description will be provided below regarding the use of machine learning to establish and exploit models of target device behavior.

In certain embodiments, the present invention is implemented in combination with the techniques described in the applicant's co-pending application PCT/CN2019/81970 the entire teaching of which is hereby incorporated into the In the latter example one cycle corresponds to one second's worth of data output by the IoT devices of the group. However, the embodiment is not limited to the case where the length of the cycle is one second.

In the training phase, many cycles' worth of these data sets are used for training to create the model. In the detection phase, the real-time data set in each cycle is used for detecting devices' abnormal behavior.

In accordance with the techniques described in the applicant's co-pending application PCT/CN2019/81970, the data which each assessment module collects from the IoT devices in its group may be data extracted from the headers of frames of wireless data output by the IoT devices. Furthermore, in some embodiments the machine-learning and subsequent identification is based on analysis of data from frame headers, but not data from the payload of the frames of wireless data. This avoids difficulties which otherwise can arise due to the fact that the payload of frames of wireless data emitted by IoT devices can often be encrypted, and often includes data whose privacy must be protected. The headers of wireless data frames generally contain address information and, unfortunately, hackers often fake such address information. Accordingly, certain embodiments of the invention exclude address information from the information that is input to the machine-learning module.

It has been found that good discrimination results are obtained in the case where each sample of data that is input to the machine-learning module in respect of each IoT device consists of data extracted from each one of a sequence of plural frame headers in the output from the IoT device. In this case the information from wireless IoT devices is treated as multiple time series, and the time series data is used to train the machine learning module.

In accordance with the techniques described in the applicant's co-pending application PCT/CN2019/81970, the wireless data received from a given IoT device $11_q$ may be processed to extract, from the headers of a sequence of P successive frames, the values of a set of N parameters. In such a case, the data set (single training data sample) for the group comprises the concatenation of the P×N data matrices for the IoT devices in the group.

An example P×N matrix generated from the output of a given IoT device $11_q$ might be:

| Frame 10 | Frame 9 | Frame 8 | Frame 7 | Frame 6 | Frame 5 | Frame 4 | Frame 3 | Frame 2 | Frame 1 |
|---|---|---|---|---|---|---|---|---|---|
| duration | duration | duration | duration | duration | duration | duration | duration | duration | duration |

-continued

| SN strength length Δt | SN strength length Δt | SN strength length Δt | SN strength length Δt | SN strength length Δt | SN strength length Δt | SN strength length Δt | SN strength length Δt | SN strength length Δt | SN strength length Δt |
| --- | --- | --- | --- | --- | --- | --- | --- | --- | --- |

The latter example relates to a case in which the IoT devices emit data according to the WiFi specification (e.g. IEEE 802.11a), data is taken from a sequence of 10 successive frames of WiFi data and the N parameters that are exploited by the machine-learning module are: Duration, SN (Sequence Number), Signal Strength, Frame Length, and Delta Time (i.e. time between two contiguous frames).

Although time series data from 10 successive frames is used in the above example (i.e. P=10), the number of frames in the sequence can be changed. Experimental results show that it is beneficial to include at least three frames in the time series. Although no explicit upper limit on the length of the sequence has been identified so far, as the number of frames included in the time series increases there is an increase in the time required to train the machine-learning module and an increase in the amount of time taken by the trained machine-learning module to perform analysis.

Furthermore, the times series may include data from headers of frames which, although in time order, are not successive to one another: for example, data may be taken from every other frame header in a time series of 2P frames. It will be understood that the manner of selecting frame headers to constitute the sequence used in the production phase should be the same as in the training phase.

Although the above example makes use of data relating to five parameters in the headers of WiFi frames (i.e. N=5), the number of parameters that are used can be adjusted depending on the amount of difference there is between authentic and inauthentic IoT devices. For example, in some cases there are significant differences between the frame-header data output by compliant and non-compliant IoT devices and it is permissible to train the machine-learning module simply using two parameters, e.g. SN and delta time. However, if the difference between compliant (e.g. authentic) and non-compliant (e.g. inauthentic) wireless IoT devices is very slight, then it may be necessary to use five parameters (e.g. all five of the parameters in the above example) to enable devices to be discriminated. The number N of parameters that are used by the machine learning module affects the accuracy of identification, with a larger value of N being associated with a greater degree of identification accuracy. The design of the machine learning module itself is not affected by the specific parameters that are selected, except insofar as the input of the machine-learning algorithm needs to be adapted to the number of parameters.

Although the above example is given in the context of discriminating IoT devices that emit data according to the WiFi specification, the invention may be applied to discriminate IoT devices that emit data frames that correspond to other wireless standards, for example, Bluetooth, Zigbee, Cellular network specifications, and so on. In the case of embodiments handling these other technical standards, various parameters can be extracted from the headers of the wireless data and input to the machine-learning module, for example: the size of wireless data, delta time of sequence data, the session/sequence/paragraph number, signal strength, the existing/unexpired time, and the transmission speed (in some cases where variable bitrate transmission is involved).

In this example, the data input to the machine-learning module of an assessment module 2 or 3 comprises, for each IoT device of the group, time-series data taken from a sequence of P successive frames of data and, from each frame header, information is taken which corresponds to a particular selection of N parameters from among the parameters that are present in the frame headers.

Various types of machine learning modules may be used by the assessment modules to analyse such time series data. In one example the machine-learning module is implemented using LSTM (Long Short-Term Memory) to analyse the patterns in this kind of time series and to identify them. However, other machine-learning architectures could be used, for example support vector machines (SVMs), other forms of recurrent neural networks (RNNs), Hidden Markov models, gated recurrent units (GRUs), and so on. Better results were obtained using an LSTM architecture compared to using a SVM architecture. Moreover, although a typical number of layers in the machine-learning architecture may be three, the embodiment is not limited to use of three layers.

It will be appreciated that the above description relates to the detection of anomalous behavior of the IoT devices. Accordingly, the assessment modules 2, 3 focus on detecting departure from a target "normal" behavior of their group of IoT devices and do not classify all the possible different types of anomaly. It can be seen that this is an instance of so-called "One-Class Classification" (OCC). Besides the techniques described above, various known techniques for performing OCC may be employed in the present invention, for example techniques described by Khan S. S., and Madden M. G. (2010) in "A Survey of Recent Trends in One Class Classification", in: Coyle L., Freyne J. (eds) Artificial Intelligence and Cognitive Science. AICS 2009. Lecture Notes in Computer Science, vol 6206. Springer, Berlin, Heidelberg.

Certain embodiments of the invention make use of an OCSVM (One-Class Support Vector Machine) to implement the desired functionality. In OCSVM, the goal of training is to find a boundary of the normal class through training using normal data. Inside the boundary is the normal actions and outside the boundary is the abnormal actions.

Experiments have been conducted in which one hundred IoT devices were assigned to respective grid points in a notional two-dimensional space (as illustrated in FIGS. 2 and 3). Ten assessment modules $2_1$-$2_{10}$ were used to monitor output from ten groups $12_1$-$12_{10}$ of the IoT devices notionally assigned to respective columns in the two-dimensional space, and ten assessment modules $3_1$-$3_{10}$ were used to monitor the output from groups $13_1$-$13_{10}$ of IoT devices assigned to ten rows in the two-dimensional space. To implement OCSVM, the assessment modules 2, 3 employed Scikit Learn (the machine learning framework in Python) and TensorFlow (the Python library for fast numerical computing, created and released by Google). After trying different values of parameters of OCSVM, it was found that the error ratio could be reduced to about 0.06%.

The identification system 1 may be implemented in various ways on hardware and/or software. For example, the identification system 1 may be implemented on a general-purpose computer by suitable programming of the computer (in which case, it will be appreciated that the various components illustrated in FIG. 3 represent various functions implemented by the computer). The recited functionality may be defined by instructions in a computer program, and execution of the instructions by a processor can implement this functionality. The present invention provides such computer programs, as well as computer-readable media (discs, tapes, USB keys, etc.) storing such instructions.

Typically, the identification system 1 may be applied in a networked environment. The identification system 1 may be integrated into a network component (e.g. an access node) or may be a server (or group of servers) or other standalone device.

Alternatively, the identification system 1 can be distributed among several software modules and/or hardware equipment (for instance the identification module being implement in a remote network component while the assessment modules being implemented in general-purpose computers located closer to the IoT devices to monitor).

Figure 4:
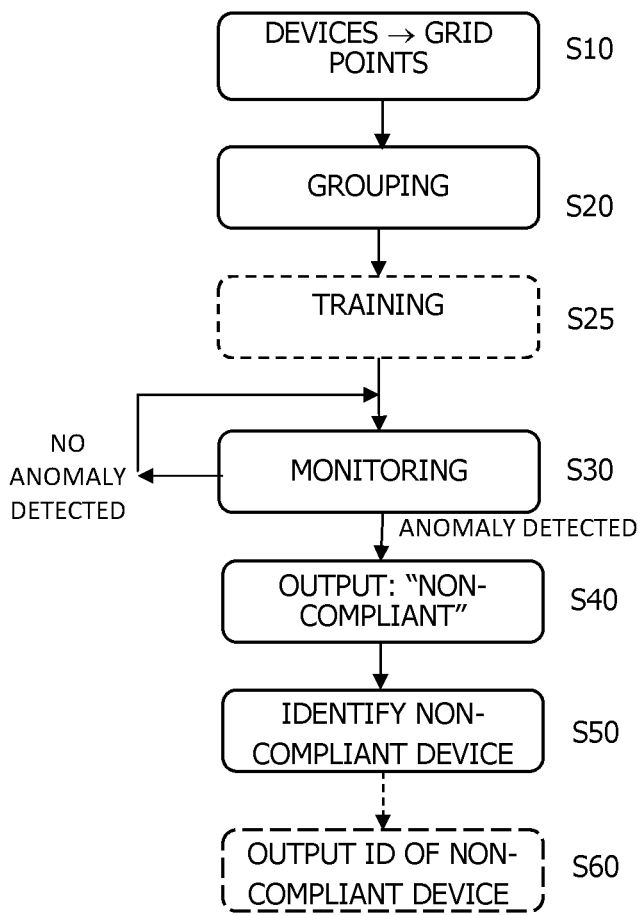
FIG. 4 is a flow diagram illustrating an example of a computer-implemented method to identify non-compliant IoT device within a set, according to an embodiment of the invention.

The present invention provides a computer-implemented method to identify non-compliant IoT devices within a set. An embodiment of such a computer-implemented method is illustrated by FIG. 4. The FIG. 4 example corresponds to the operation of the above-described identification system 1.

In the example illustrated in FIG. 4, the computer-implemented identification method to identify non-compliant IoT devices, from within a set (S) of plural IoT devices designed to function in conformity with a behaviour model, may advantageously include a process (S10) of assigning each IoT device (11n) to a respective grid point $(p_{1n}, \ldots, p_{mn})$ in an m-dimensional space, where m is greater than 1.

The method may further advantageously include—for each dimension of the m-dimensional space—grouping (S20) IoT devices assigned to grid points that are aligned with one another at a respective position along the respective dimension into respective groups (12, 13), an assessment module (e.g. $2_1, \ldots, 2_j, 3_1, \ldots, 3_k$ as described above) being associated with each of these respective group in order to monitor its behaviour.

Once the IoT devices have been grouped into respective groups in each dimension of a m-dimensional space where m is greater than 1, the functioning of each group of IoT devices is monitored (S30) to detect behaviour deviating from a behavioural model (15) of the IoT devices of the group. Typically, the behaviour models applied by the assessment modules are initially untrained. In such a case, when a group of devices has been assigned to a given assessment module a training phase (S25) may be implemented so that the assessment module learns the normal pattern of data output by its group of devices when they are behaving in a compliant manner (i.e. the behaviour model is established by this training phase).

In the monitoring process (S30), for each group, data output by the IoT devices of this group is collected and analysed by the assessment module associated with this group.

An output is generated (S40) indicative of non-compliant behaviour in the event that the monitoring of S30 indicates that behaviour in the group of IoT devices deviates from the behavioural model (15) of the IoT devices of said group.

The method then comprises identifying (S50) one (or more) non-compliant IoT device(s) in the set (S) of plural IoT devices, by combining outputs as previously described, i.e. generated in step S40 from the monitoring of groups defined in different dimensions of the m-dimensional space.

If desired at this stage, an output 20 may be generated identifying the non-compliant IoT device(s) (S60).

The implementation of the method of FIG. 4 can exploit techniques discussed above in connection with the identification system 1.

Although the invention has been described above with reference to certain specific embodiments, it is to be understood that various modifications and adaptations may be made within the scope of the appended claims.

So, for example, although FIG. 3 illustrates an embodiment in which the identification system 1 according to the invention comprises two sets 2, 3 of assessment modules monitoring behaviour of IoT devices having labels assigned in two-dimensions, it will be understood that the number of sets of assessment modules increases as the number of dimensions of the exploited multidimensional space increases.

The invention claimed is:

1. A system configured to identify non-compliant IoT devices from within a set of IoT devices designed to function in conformity with a behavior model, the system comprising a processor and a memory, the system configured to:

perform a plurality of assessments to monitor the functioning of said set of IoT devices to detect, as non-compliant behavior of IoT devices, behavior deviating from the behavior model, wherein:

each IoT device is assigned to a respective grid point in an m-dimensional space, where m is greater than 1, the IoT devices arranged in a plurality of groups of IoT devices, each of the groups of IoT devices comprising IoT devices assigned to grid points that are aligned with each other along at respective positions along a respective dimension of the m-dimensional space;

a respective subset of the plurality of assessments is assigned to each dimension of said m-dimensional space; and in each subset of assessments, each assessment is arranged to monitor behavior of a group of IoT devices assigned to grid points that are aligned with one another at a respective position along the respective dimension and to produce an output indicative of non-compliant behavior in the event that the monitoring indicates that behavior in the group of IoT devices deviates from a behavioral model of the IoT devices of said group; and identify at least one non-compliant IoT device in said set of IoT devices by combining outputs from assessments in subsets assigned to the different dimensions of the m-dimensional space.

2. The system of claim 1, wherein the assessments are configured to generate data samples comprising time series data extracted from the output of the IoT devices in the group and to assess whether or not the behavior of the group of IoT devices is compliant with the behavior model by analysis of the data samples comprising the time series data.

3. The system of claim 2, wherein the assessments are configured to generate data samples comprising time series data extracted from frame headers of wireless data output by the IoT devices.

4. The system of claim 3, wherein the assessments are configured to generate data samples comprising time series data excluding data from payload of frames of wireless data output by the IoT devices.

5. The system of claim 3, wherein the assessments are configured to generate data samples comprising time series data excluding address data representing addresses of the IoT devices providing the wireless data.

6. The system of claim 1, wherein the assessments are configured to implement one-class classification to determine whether behavior of the respective group of IoT devices is compliant or non-compliant with the behavior model.

7. The system of claim 6, wherein the assessments comprise one-class classification support vector machines.

8. The system of claim 1, wherein at least one IoT device of the set of IoT devices forms a part of m groups of IoT devices of the plurality of groups of IoT devices.

9. The system of claim 1, wherein each IoT device of the set of IoT devices forms a part of a unique subset of the plurality of groups of IoT devices.

10. A computer-implemented method of identifying non-compliant IoT devices from within a set of IoT devices designed to function in conformity with a behavior model, wherein, for each dimension of an m-dimensional space where m is greater than 1, IoT devices are grouped into a plurality of groups of IoT devices, each of the groups of IoT devices comprising IoT devices assigned to grid points that are aligned with each other along at respective positions along a respective dimension of the m-dimensional space, the method comprising:

Monitoring, by a respective assessment of a subset of a plurality of assessments assigned to each respective dimension of said m-dimensional space, the functioning of each respective group of IoT devices to detect behavior deviating from a behavioral model of the IoT devices of said group;

generating an output, by the respective assessment, indicative of non-compliant behavior in the event that the monitoring indicates that behavior in the respective group of IoT devices deviates from a behavioral model of the IoT devices of said group; and identifying at least one non-compliant IoT device in the set of plural IoT devices by combining outputs generated from the monitoring of groups defined in different dimensions of the m-dimensional space.

11. The computer-implemented method of claim 10, wherein the detecting of behavior deviating from said behavioral model of the IoT devices of said group employs a trained machine learning module.

12. The computer-implemented method of claim 11, wherein the detecting of behavior deviating from said behavioral model of the IoT devices of said group comprises analyzing, by the trained machine-learning module, data from frame headers of wireless data output by the IoT devices without analyzing data from payload of frames to which said frames headers belong.

13. The computer-implemented method according to claim 11, wherein the detecting of behavior deviating from said behavioral model of the IoT devices of said group comprises analyzing, by a trained machine-learning module, frame header data that excludes address data representing the address of the IoT devices providing a wireless data.

14. A non-transitory computer-readable medium having stored thereon instructions which, when executed by a processor, cause the processor to carry out the method of claim 10.

* * * * *